March 9, 1954 M. E. FELL 2,671,427
PORTABLE ANIMAL COMMODE
Filed May 23, 1950
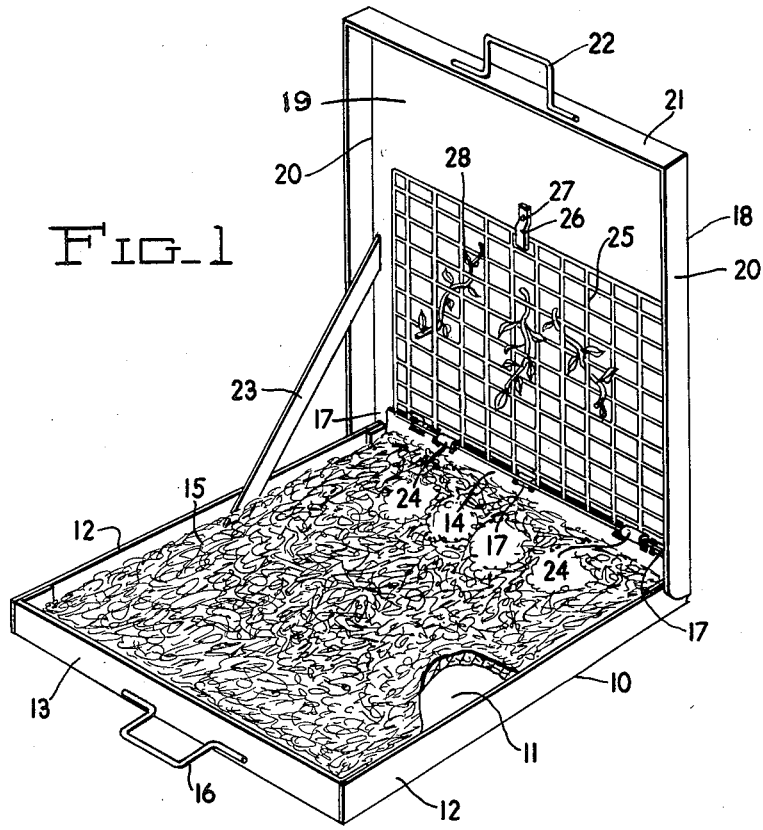
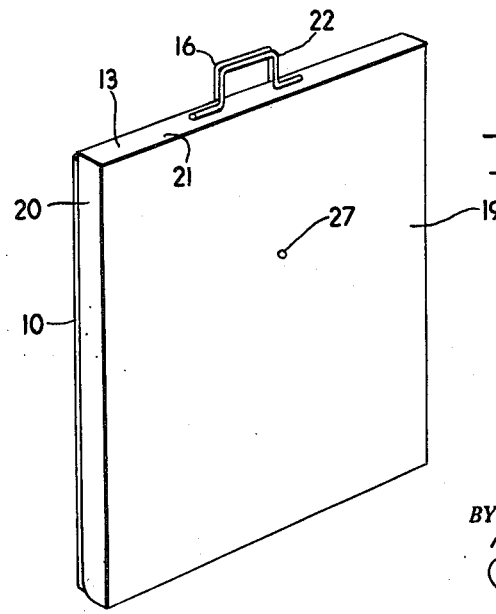
INVENTOR.
MARTHA E. FELL
BY
ATTORNEY Patented Mar. 9, 1954

2,671,427

UNITED STATES PATENT OFFICE 2,671,427

PORTABLE ANIMAL COMMODE

Martha E. Fell, Tucson, Ariz.

Application May 23, 1950, Serial No. 163,744

3 Claims. (Cl. 119—1)

This invention relates to portable animal commodes.

It is the principal object of the present invention to provide a commode for animals which may be employed while traveling, may be used in hotels, and the like, and which, while simple in construction, is sturdy, easily cleaned and prepared for use, and which may be quickly placed in condition for use.

It is a further object of the present invention to provide a portable animal commode which may be carried, stored, and handled with hand luggage.

It is a further object of the present invention to provide a portable animal commode which will facilitate the training of animals and which will require a minimum of training to persuade the animal to use the same.

It is a further object of the present invention to provide an animal commode, of the character aforesaid, which will be free from objectionable odor in the intervals between use.

Other objects and advantageous features of the invention will be apparent from the specification and claims.

The nature and characteristic features of the invention will be more readily understood from the following description, taken in connection with the accompanying drawing forming part hereof, in which.

Figure 1 is a view in perspective of a preferred form of animal commode in accordance with the present invention, and in open condition ready for use; and Fig. 2 is a view in perspective of the commode shown in Fig. 1, in closed condition for carrying or storage.

It should, of course, be understood that the description and drawing herein are illustrative merely, and that various modifications and changes may be made in the structure disclosed without departing from the spirit of the invention.

Referring now more particularly to the drawing, a main tray 10 is provided, preferably formed of sheet metal, and preferably of rectangular shape, with a flat bottom wall 11, side walls 12 perpendicular to the bottom wall 11, and end walls 13 and 14, also perpendicular to the bottom wall 11.

The walls 12, 13 and 14 at their junctions, are preferably formed in any desired manner to provide a tray 10 free from any tendency to leakage. The interior of the tray 10 is preferably substantially filled with peat moss, as at 15.

On the exterior of the end wall 13, a handle 16 is provided, preferably formed of wire. At the upper edge of the end wall 14, a cover 18 preferably also formed of sheet metal, is hingedly connected to the tray 10 in any desired manner. For this purpose spaced hinges 17 having their respective plates secured respectively to the tray 10 and cover 18 may be employed.

The cover 18 has a top wall 19, side walls 20 and an end wall 21. The side walls 20 and end wall 21 are adapted to be disposed exteriorly of the side walls 12 and the end wall 13 and in overlapped relation thereto in closed position.

The end wall 21 is preferably provided with a handle 22 which is adapted to be alined with the handle 16 on the tray 10.

The cover 18 and the tray 10 may be held in separated relation as indicated in Fig. 1, in any preferred manner, but for this purpose a stick or strip of wood 23 may be employed with its ends in engagement respectively with the tray 10 and with the cover 18 and at an angle thereto. The stick 23, when not in use, may be laid in the interior of the tray 10.

The cover 18 has, hingedly secured thereto, such as by spaced hinges 24, a grill 25, provided preferably of wire mesh. The grill 25 is normally adapted to be held parallel to the cover wall 19 by a clamp 26, pivotally mounted on a rivet 27 but may be swung about the hinges 24 if desired.

The grill 25 is adapted for the insertion of leafy branches 28 from any suitable shrubs or trees to simulate natural conditions, and to facilitate the training and encourage the use of the commode.

The mode of use will, it is thought, be clear from the foregoing but it may be noted that with the cover 18 and the tray 10 in the position illustrated in Fig. 2, the commode may be readily carried by the handles 16 and 22, and, when desired, may be opened up for use.

The commode in condition for use is illustrated in Fig. 1, with the cover 18 disposed approximately at a 90° angle with respect to the tray 10 and with the strip 23 in position for holding the cover 18 in open position. Full and adequate sanitary provisions are available for the animal, and particularly for dogs, although the commode may be used by other animal pets.

If it is desired to clean the commode, this may be readily effected by shaking or otherwise removing the branches 28 from the grill 25 and dumping the peat moss 15 from the tray 10. The commode may then be quickly and easily washed with a hose, and upon refilling with fresh peat moss 15 and with new branches 28 again applied to the grill 25, is ready for carrying and for use.

I claim:

1. An animal commode comprising a tray containing absorbent material and having a flat bottom wall and upwardly extending side walls and ends, a cover for said tray hingedly connected thereto at end portions of said tray and cover and disposed upwardly and normal to said tray in open position and parallel to said bottom wall in closed position, a sheet of foraminous material interposed between said cover and said tray to support leafy branches, and supporting means for said sheet on the interior of said cover and engaging said sheet.

2. An animal commode comprising a tray containing absorbent material and having a flat bottom wall and upwardly extending side walls and ends, a cover for said tray connected to one of said ends and disposed upwardly and normal to said bottom wall in open position and parallel to said bottom wall in closed position, said cover having side walls disposed in overlapping relation to the side walls of the tray in closed position and an end wall disposed in overlapping relation to the other of said end walls of the tray in closed position, a grill of wire mesh connected to said cover to support leafy branches, and a clamp on said cover for holding said grill in flat parallel relation thereto.

3. A portable animal commode comprising a tray containing absorbent material and having a flat bottom wall and upwardly extending side walls and ends, a cover for said tray hingedly connected to one of said ends and disposed vertically upwardly in open position and parallel to said bottom wall in closed position, said cover having side walls disposed in overlapping relation to the side walls of the tray in closed position and an end wall disposed in overlapping relation to the other of said end walls of the tray in closed position, a grill of wire mesh hingedly connected to said cover to support leafy branches, a clamp for normally holding said grill in flat parallel relation to said cover, and carrying handles on said end wall of said cover and said end wall of said tray disposed in alinement when said cover and tray are in closed position.

MARTHA E. FELL.

References Cited in the file of this patent

UNITED STATES PATENTS

| Number | Name | Date |
|---|---|---|
| 246,503 | Haslett | Aug. 30, 1881 |
| 1,314,915 | Trullench | Sept. 2, 1919 |
| 1,773,141 | Hodgson | Aug. 19, 1930 |
| 1,827,929 | Bigelow | Oct. 20, 1931 |
| 2,073,390 | Giblette | Mar. 9, 1937 |
| 2,504,282 | Tobias | Apr. 18, 1950 |